(12) United States Patent
Rainer

(10) Patent No.: US 6,521,340 B2
(45) Date of Patent: Feb. 18, 2003

(54) SULFUR-CONTAINING ALIPHATIC POLYMER FOR THE SELECTIVE ABSORPTION OF DISSOLVED METAL SPECIES

(76) Inventor: Norman B. Rainer, 2008 Fondulac Rd., Richmond, VA (US) 23229

(\*) Notice: Subject to any disclaimer, the term of this patent is extended or adjusted under 35 U.S.C. 154(b) by 34 days.

(21) Appl. No.: 09/805,838

(22) Filed: Mar. 15, 2001

(65) Prior Publication Data

US 2002/0161122 A1 Oct. 31, 2002

(51) Int. Cl.[7] .............................. B32B 5/00; B32B 3/00; C08J 5/20

(52) U.S. Cl. ................. 428/402; 428/305.5; 428/314.2; 521/25; 521/27; 521/29; 521/30; 525/419

(58) Field of Search ....................... 525/419; 428/305.5, 428/314.2, 402; 521/25, 27, 29, 30

(56) References Cited

U.S. PATENT DOCUMENTS

| | | |
|---|---|---|
| 3,220,960 A | 11/1965 | Wichterie et al. |
| 3,329,657 A | 7/1967 | Strazdins et al. |
| 3,715,339 A | 2/1973 | Rainer |
| 3,780,003 A | 12/1973 | Seymour et al. |
| 3,893,988 A | 7/1975 | Setmour et al. |
| 4,326,009 A | 4/1982 | Royer |
| 5,387,365 A | 2/1995 | Moriya et al. |
| 5,523,002 A | 6/1996 | Carey et al. |
| 5,891,956 A | 4/1999 | Smith et al. |

*Primary Examiner*—Ana Woodward
(74) *Attorney, Agent, or Firm*—Norman Rainer

(57) ABSTRACT

A sulfur-containing water insoluble hydrogel polymer for selectively removing trace amounts of dissolved metal species is produced from a reaction product of nitrilotriacetic acid (NTA) and polyethylenimine (PEI) which is then treated in a water-swollen state with carbon disulfide. The polymer has a physical configuration that facilitates formation of a porous stationary bed through which water can pass for treatment.

19 Claims, No Drawings

SULFUR-CONTAINING ALIPHATIC POLYMER FOR THE SELECTIVE ABSORPTION OF DISSOLVED METAL SPECIES

BACKGROUND OF THE INVENTION

1. Field of the Invention

This invention relates to the removal of dissolved metals from water, and more particularly concerns polymers and the use thereof for the absorptive removal from aqueous media of trace amounts of dissolved ionized species of metals.

2. Description of the Prior Art

Various techniques are known for removing dissolved ionized metals from water. Activated carbon has long been used for the absorption of dissolved metals from aqueous media. The most significant use of activated carbons for absorption of dissolved metals is in gold mining operations. In such use, activated carbon granules absorb gold in the form of aurocyanide anion produced by the leaching of gold ore with dilute solutions of sodium cyanide. Although effective in said removal of gold from ore, long contact times on the order of 24 hours are required in a tumbling operation.

The removal of nuisance or toxic metals from aqueous streams has generally been accomplished by precipitative methods wherein an ingredient capable of forming an insoluble compound with the dissolved metal is added to the stream. Sufficient interaction time is usually achieved in a holding vessel wherein the insoluble compound forms and grows into a crystalline solid of filterable size. The solid is then removed by settling, filtration or centrifugation, and is usually discarded as a sludge which in fact may require expensive disposal costs.

The separation of dissolved species from water may also be achieved by way of reverse osmosis techniques wherein a pressurized aqueous stream is fed to a selectively permeable membrane. Although reverse osmosis operations are successful in specialized applications, the requisite high pressurization is costly, and the membranes are susceptible to fouling. Also, a concentrated rejectate stream containing the removed species may constitute a significant disposal problem.

Ion exchange resins of strong acid or strong base functionality have been used for the absorption of commonly abundant dissolved cations and anions, respectively. However, commonplace ion exchange resins cannot remove trace ions because they indiscriminately absorb the commonly abundant ions, leaving no residual absorption capacity for trace species. Specialized ion exchange resins, referred to as "chelation" resins are known which selectively absorb only "heavy" metals. Such specialized resins are usually comprised of beads of styrene/divinylbenzene polymer having grafted iminodiacetic acid groups. "Heavy" metals are generally toxic species, usually found in only trace levels in natural waters or industrial effluents. The heavy metals may be further characterized as transition group metals classified in groups I B through VIII B of the Periodic Table, and generally characterized in having incomplete inner rings of electrons or being otherwise capable of existing in more than one valence state.

When a metal-saturated chelation resin must ultimately be disposed of, it is found that the preferred method of disposal, namely incineration, is not a viable option because of the large amounts of volatile aromatic hydrocarbons generated during incineration. The aromatic hydrocarbons are considered to be toxic substances. Although said aromatic hydrocarbons can be removed from the incineration gases by activated carbon, large amounts of the carbon are required.

Chelation resins are not generally capable of removing toxic species to extremely low concentration. For example, where it is desired to remove species such as mercury or lead to concentrations below one part per billion (ppb), chelation resins are usually ineffective. One explanation for said shortcoming is that forces of bonding that hold the metal ion are not sufficiently strong to prevent some dissociation.

The use of aliphatic polymers of nitrilotriacetic acid (NTA) and polyethylenimine (PEI) for the selective absorption of dissolved ions has been disclosed in U.S. Pat. Nos. 3,715,339; 4,332,916; 5,002,984; 5,597,850; and elsewhere. Said PEI-based polymers, having recurring amine groups and iminodiacetic acid groups, absorb cationic species by two different mechanisms. In one mode of function, the amine groups serve as ligands which form a metallo-organic coordination compound with the cation. In a second mode of function, the iminodiacetic acid groups form a at chelation ring which include the absorbed cation. Whereas some cations, such as a copper, cadmium and lead become strongly bound to the polymer, presumably because of bonding via both mechanisms, other heavy metal cations are not sufficiently bound to produce residual concentrations below 1 ppb.

The reaction of PEI with carbon disulfide ($CS_2$) has been disclosed in U.S. Pat. No. 5,387,365 to Moriya et. al. The purpose of the Moriya et. al. modification of PEI is to produce a water-soluble polymer capable of forming a filterable precipitate with dissolved metal cations. Although the Moriya et. al. modified PEI appears to exhibit strong bonding affinity for dissolved metal cations, it does not advance the practicality of metal removal beyond the older technique of merely adding a precipitation agent such as sodium sulfide, followed by filtration.

It is accordingly an object of the present invention to provide a water-insoluble polymer for the rapid and selective absorption of trace amounts of heavy metal species from aqueous solutions.

It is another object of this invention to provide a polymer as in the foregoing object which is amenable to disposal by way of incineration.

It is a further object of the present invention to provide a polymer of the aforesaid nature amenable to disposition in the form of a stationary porous bed through which water can be caused to flow.

These objects and other objects and advantages of the invention will be apparent from the following description.

SUMMARY OF THE INVENTION

The above and other beneficial objects and advantages are accomplished in accordance with the present invention by a sulfur-containing water insoluble hydrogel polymer comprised of a reaction produce of NTA and PEI, further reacted with carbon disulfide, said polymer having a physical form capable of producing a stationary porous bed through which water can be caused to flow.

DESCRIPTION OF THE PREFERRED EMBODIMENTS

The expression "hydrogel," as employed to describe the polymer of the present invention is intended to denote a polymer which can reversibly absorb large amounts of water to produce a water-swollen state. The hydrogel polymers of the present invention, in their water-swollen state will preferably be comprised of between 40% and 60% water. It has been found that, at water absorption levels above 60%, the polymer has insufficient cohesive strength for use in fixed bed water treating applications. At water absorption levels below 40% the rate of diffusion of absorbable ions into the water-swollen polymer is adversely affected.

The PEI useful in the production of the hydrogel polymer of the present invention preferably has a molecular weight between about 1200 and 10,000. It has been found that molecular weights above 10,000 cause unduly high viscosities in the course of producing the polymer of this invention. PEI is water-soluble in substantially all molecular weights, and generally contains primary, secondary and tertiary amine groups in the approximate ratio of 1:2:1, respectively. The primary amine groups are terminal groups pendant from the polymer backbone.

The aforesaid reaction product of NTA and PEI is produced by initially dissolving NTA in an aqueous solution of PEI. NTA is not water-soluble, but dissolves in the aqueous PEI solution by way of salt formation with PEI. The weight radio of NTA/PEI is preferably in the range of 0.6–1.2. The resultant homogenous prepolymer solution is then heated to drive off the solution water, thereby producing a thick paste. Heating is then continued at a "curing" temperature in the range of 140° C. to 160° C. to produce a rigid, water-insoluble cross-linked polymer product, to be referred to hereinafter as a "first reaction product."

The nature of the curing reaction is to convert the initially formed salt bonds to covalent amide bonds. This reaction is essentially the same as the classic thermal condensation polymerization which produces nylon 6,6 from an aqueous solution of hexamethylene diamine and adipic acid. The following equation is typical of such polymerization.

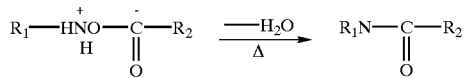

where $R_1$ and $R_2$ are organic radicals containing at least one other functional group capable of participating in amide bond formation.

In the production of said first reaction product, the NTA molecules, which are trifunctional by virtue of three carboxyl groups, interact with secondary amine groups of PEI to establish amide bonds. A sufficient number of the NTA molecules interact difunctionally with separate PEI molecules to produce a cross-linked polymer structure of extremely high molecular weight which is no longer water-soluble. However, a significant amount of the NTA interacts only partially with the PEI, thereby causing the formation of pendant iminodiacetic acid groups having chelation functionality for the selective absorption of dissolved heavy metal cations.

Said first reaction product can be produced "neat", namely in the absence of additives or other structures, in which case it typically has a granular physical configuration. Alternatively, the first reaction product can be generated by impregnation of a porous support such as an open-celled sponge, in which case said first reaction product is produced as a coating or deposit that assumes the shape of the porous support.

The first reaction product, in its cured, dry state, is then preferably contacted with a dilute aqueous solution of a strong base such as sodium hydroxide, potassium hydroxide or ammonium hydroxide. Such treatment, which produces a base-neutralized first reaction product, serves several purposes: A) it removes any unreacted NTA, B) it causes the reaction product to achieve a water-swollen state, and C) it converts unreacted carboxyl groups on NTA molecules bound to the polymer to the salt form (e.g. sodium carboxylate).

The sulfur-containing hydrogel polymer of the present invention is produced by causing carbon disulfide to react with the water-swollen base-neutralized first reaction product. It is to be noted that said first reaction product is in a solid, structured form, whether granules or a porous matrix. It has been discovered that, in order to achieve homogeneity of reaction of the carbon disulfide with said first reaction product in solid form, it is necessary to bring said two components together in a sealed system at a temperature which causes the carbon disulfide in vapor form to slowly react with the solid first reaction product. Suitable temperatures are in the range of 4° C. to 33° C., and require reaction times of about 35 to 12 hours, respectively. Under such conditions, preferably achieved in a slowly rotated drum, uniform reaction of the carbon disulfide with the solid first reaction product is accomplished.

Although not wishing to be bound by theoretical considerations, the carbon disulfide is considered to react with the primary amine groups of the base-neutralized first reaction product in accordance with the following equation to form the base salt of dithiocarbamate:

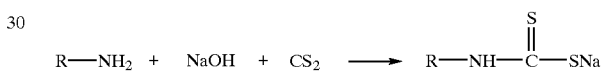

wherein R is the remainder of a molecule of the first reaction product polymer.

Another reaction mode involves two molecules of the first reaction product polymer to produce a cross-linking effect by way of formation of a thiourea bond, as in the following equation:

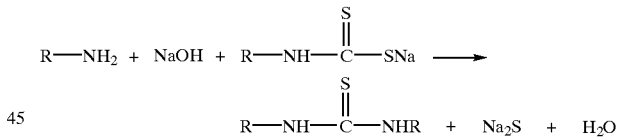

The cross-linking effect manifests itself by causing the resultant hydrogel polymer to have a slightly diminished water absorption capacity, and causing shaped sponge products which incorporate the polymer to have an increased compressive modulus.

The effect of the incorporation of said sulfur-containing moieties into the hydrogel polymer is to cause the polymer to exhibit higher affinity for cationic heavy metal ions. In particular, aqueous streams treated with the sulfur-containing hydrogel polymer of this invention will show smaller effluent concentrations of heavy metal cations in comparison with similar treatment with the non-sulfur-containing first reaction product.

The amount of sulfur-containing moieties incorporated into the hydrogel polymer is preferably such that between 2% and 12% of carbon disulfide reacts with the first reaction product based upon the dry weight of said first reaction product. By elemental analysis, the resultant polymer will contain between 1% and 7% S. Achievement of the minimal sulfur add-on can be qualitatively ascertained by testing the resultant sulfur-containing hydrogel polymer with a solution of copper sulfate. The copper sulfate causes the sulfur-containing hydrogel polymer to develop a black color. By way of contrast, the first reaction product, when similarly treated with copper sulfate solution, develops a dark blue color. The difference in coloration is an indication of not only the modified chemical composition of the sulfur-containing hydrogel polymer, but an indication of its different mode of complex formation with heavy metals.

The sulfur-containing hydrogel polymer of the present invention is preferably employed as a stationary bed, through which water is passed for purposes of selective removal of dissolved heavy metals. Although primarily intended for the removal of cationic forms of metals, the polymer has also been found capable of removing zero valent forms of metals such as mercury and lead in finely dispersed form. The stationary bed may be comprised of the polymer in granular form or in the form of pieces of sponge or other porous substrates which incorporate the polymer. Employing such beds, it has been found that better than 90% removal of dissolved heavy metals can be achieved with residence times of three minutes and greater. Treated effluents are obtainable which have concentrations of metals close to current detection limits. At saturation, the sulfur-containing hydrogel polymer of this invention can hold between 5% and 25% of the absorbed metal, on a dry weight basis.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

A prepolymer solution is prepared by adding 40 parts of NTA to a stirred solution of 40 parts of water and 40 parts of PEI having a molecular weight of about 1800. The resultant homogenous solution is poured into a stainless steel tray to form a layer of about ¼ inch depth.

The tray containing the prepolymer solution is placed in an oven at 155° C. The solution water evaporates to produce a paste-like deposit. With continued heating at the same temperature, the paste-like deposit forms viscous bubbles, and eventually hardens to a rigid bubbled mass. The tray is removed from the oven.

A 0.5% solution of sodium hydroxide is poured into the tray to cover the bubbled mass, and allowed to stand 24 hours. The bubbled mass undergoes a decrepitation or self-granulation to produce a water swollen base-neutralized granular first reaction product.

The propensity of the dry first reaction product to exhibit decrepitation is in fact a defining characteristic of this product.

The granules are wet sieved to produce a fraction that passes a 20 mesh sieve and is retained on a 50 mesh screen (and thereby designated 20/50 mesh size). The sieved granules are blotted dry. The water content of the blotted granules is found to be 51%. When a sample of said first reaction product granules is treated with 5% copper sulfate solution, the granules rapidly develop a dark blue color.

The aforesaid water swollen, base-neutralized and sieved first reaction product granules are placed in a screw cap polyethylene container. Carbon disulfide is added to the container in an amount equal to 5% of the dry weight of the granules. The cap is immediately sealed, and a rotation of the sealed container is begun while maintaining the container at 21° C. Said rotation is continued intermittently for 32 hours, during which period the carbon disulfide, in vapor phase, reacts completely and uniformly with the water swollen granules to produce the hydrogel polymer of the present invention. Following washing with water, elemental analysis shows the polymer to contain 3.9% S. The washed granules, when treated with copper sulfate solution, turn black, and also turn black when exposed to mercury vapor.

EXAMPLE 2

Some of the sulfur-containing granular hydrogel polymer of Example 1 is loaded into a glass burette of ½ inch inside diameter to produce a bubble-free bed of 5 inch height.

A water influent containing 687 parts per billion (PPB) of $Hg^{++}$ is caused to flow downwardly through the bed at different flow rates, and samples of effluent are taken and analyzed for $Hg^{++}$ at each flow rate.

In a similar comparison test, the base-neutralized first reaction product granules are tested with the same water influent. Analytical results for the $Hg^{++}$ content of the effluents are presented in Table I.

TABLE I

| Flow Rate* | 2 | 3 | 4 | 5 | 6 |
|---|---|---|---|---|---|
| Sulfur-containing hydrogel polymer of this invention | 27** | 2 | <1 | <1 | <1 |
| Non-sulfur-containing first reaction product | 39 | 21 | 16 | 3 | <1 |

*minutes of contact with the bed
**all $Hg^{++}$ effluent concentrations in PPB

As the data of Table I indicate, the sulfur-containing hydrogel polymer of this invention performs better than its precursor first reaction product in the absorption of cationic mercury.

EXAMPLE 3

Into separate screw cap vials there are placed the base-neutralized first reaction product granules and the sulfur-containing hydrogel granules of this invention as produced in Example 1.

A drop of mercury is added to each vial, and the vials are allowed to stand at room temperature for five days. The sulfur-containing hydrogel granules turn black as a result of absorption of elemental mercury vapor emergent from the drop of mercury.

The first reaction product granules undergo no change in appearance after the same duration of exposure to the mercury. This again illustrates the different functionality imparted to the hydrogel polymer of this invention by virtue of its manner of production.

EXAMPLE 4

The prepolymer solution of Example 1 is employed to impregnate individual cuboid pieces of open celled sponge of regenerated cellulose. The impregnated pieces are squeezed between rollers to produce drip-free pieces having a 245% add-on of the solids content of the prepolymer solution.

The impregnated sponge pieces are then heated in an oven at 151° C. for one hour to achieve curing of the prepolymer to produce a first reaction product durably incorporated into the sponge pieces. The cured sponge pieces are then soaked in 0.5% NaOH solution, then washed with water and blotted to remove interstitial water from the pores of the sponge.

The damp sponge pieces, containing the base-neutralized first reaction product, is then entered into a sealable rotating drum with an amount of carbon disulfide equivalent to 9% by weight of the sponge, on a dry weight basis. The drum is sealed and rotated periodically for 18 hours duration at a temperature of 28° C. At the end of said period of rotation, the drum is opened, and there is no evidence of unreacted carbon disulfide.

Some of the resultant pieces of sponge containing sulfur-containing hydrogel polymer are washed with water and blotted dry to remove interstitial water. Some pieces of the precursor, non-sulfur-containing sponge are similarly washed and blotted. Both the sulfur-containing and non-sulfur-containing sponges are subjected to testing for compressive modulus. It was found that the force (in lbs/cm$^2$) to achieve 50% compression of the non-sulfur-containing sponge is 2.55 lbs/cm$^2$, whereas the comparable force to achieve 50% compression of the sulfur-containing sponge is 2.95 lbs/cm$^2$. Such increase in compressive strength as a result of the treatment with carbon disulfide strongly suggests that the carbon disulfide achieves cross-linking of the first reaction product polymer to produce a stiffer polymer structure.

EXAMPLE 5

Sponge pieces as produced in Example 4, and having a ½" cubic shape and containing 69% by weight of the sulfur-containing hydrogel polymer of this invention, are loaded into an acrylic absorption column of 8" inside diameter, producing a bed of five foot height.

A 220 gallon sample of river water at 21° C. containing large amounts of naturally occurring sodium, potassium, calcium and magnesium, and spiked with 118 parts per billion (PPB) of mercury in the form of mercuric chloride, is pumped at a rate of 1.05 gallons per minute upwardly through the bed, providing a residence time in the bed of 8.6 minutes. The concentration of $Hg^{++}$ in the effluent from the column after 70 gallons is 6.62 PPB; after 140 gallons is 7.12 PPB; and after 215 gallons is 6.58 PPB. This represents a 94% removal of the Hg.

Such performance illustrates the ability of the sulfur-containing hydrogel polymer, in the form of a porous stationary bed, to rapidly and selectively remove trace amounts of toxic metals. When the mercury-laden sponge pieces are incinerated at 950° C., essentially no aromatic hydrocarbons are detected in the combustion gas.

EXAMPLE 6

A piece of sponge containing base-neutralized first reaction product, as prepared in Example 4 is treated to saturation with copper sulfate solution. The resultant piece of sponge, having a dark blue color, is thoroughly washed with water to remove any unabsorbed copper.

The washed piece of sponge is placed in a 50 cc beaker containing 25 cc of distilled water and further containing a piece of sponge impregnated with the sulfur-containing hydrogel polymer of this invention, as produced in Example 4.

The beaker is covered and allowed to stand one week at room temperature. It is found that, the sponge which contains the sulfur-containing polymer of this invention, initially having an amber color, becomes black in color, indicating that copper has transferred from the non-sulfur-containing first reaction product to the sulfur-containing polymer of this invention. Such observation is a clear indication that the sulfur-containing hydrogel polymer of this polymer has stronger metal bonding characteristics than the precursor first reaction product.

EXAMPLE 7

An aqueous prepolymer solution is prepared from 1.2 parts NTA and 1.0 part PEI having a molecular weight of 5,000. The solution is heated at 140° C. in a shallow stainless steel tray to drive off the water of solution, then heated further at 150° C. to produce a rigid cross-linked first reaction product.

The first reaction product is immersed in a 0.5% NaOH solution for 24 hours. Decrepitation occurs, producing a water-swollen, base neutralized granular mass of hydrogel polymer. The mass is sieved to obtain a 40/80 fraction. The sieved granules are blotted dry, then placed in a drum with an amount of carbon disulfide equal to 12% of the dry weight of the polymer. The drum is sealed and rotated for 12 hours at 33° C. Upon opening the drum, no odor of carbon disulfide is detectable. The treated granules are washed with water. Their water-holding capacity is found to be 45%.

Some of the sulfur-containing granules are poured into a burette of 0.5 inch inside diameter prefilled with water, thereby producing a bubble-free bed of 5 inch height. Accordingly, the ratio of height (H) to diameter (D) of the bed is 10. An aqueous test solution containing 20 parts per million (ppm) ethylenediamine tetraacetic acid (EDTA) and 10 ppm lead in the form of lead chloride is passed downwardly through the bed at a rate such as to provide a residence time in the bed of 2 minutes. The effluent thereby emergent from the bed is found to contain less than 10 parts per billion of lead.

The results of this Example accordingly demonstrate that the sulfur-containing hydrogel polymer of the present invention, in the form of a stationary bed of granules, is capable of achieving substantially 100% removal of lead within a two minute contact time. It further demonstrates that the strength of bonding of lead to the functional groups of the polymer is greater than the strength of the bonding of lead to EDTA.

In general, when the granules are disposed in a stationary bed in a treatment column, the ratio of bed height to bed diameter (H/D) is preferably between 3 and 10. However, when the granules are disposed within a self-treatment drum having inlet and outlet ports, the H/D ratio may be as small as 1.5. Flow rates through the beds should be adjusted to obtain the desired percent removal of the sought species. In general, the efficiency of removal varies inversely with contact time within the bed. However, certain species, such as mercury, lead and silver can be effectively removed within only one minute contact time.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A sulfur-containing water insoluble hydrogel polymer comprised of a thermally produced cross-linked polyamide reaction product of nitrilotriacetic acid (NTA) and polyethylenimine (PEI), further reacted with carbon disulfide, said polymer having selective absorption affinity for dissolved heavy metals and having a physical form capable of producing a stationary porous bed through which water can be caused to flow.

2. The polymer of claim 1 containing between 1% and 10% sulfur, as ascertainable by way of elemental analysis.

3. The polymer of claim 1 wherein said polymer is capable of absorbing water to produce a water-swollen state of the polymer containing between 40% and 60% water.

4. The polymer of claim 1 wherein said polymer contains thiocarbamate groups.

5. The polymer of claim 1 wherein said polymer contains thiourea groups.

6. The polymer of claim 1 which is further cross-linked by virtue of said treatment with carbon disulfide.

7. The polymer of claim 1 further characterized in that it turns black when treated with copper sulfate solution.

8. The polymer of claim 1 further characterized in that it turns black upon exposure to mercury vapor.

9. The polymer of claim 1 further characterized as having iminodiacetic acid groups.

10. The polymer of claim 1 wherein said PEI has a molecular weight between 1200 and 10,000.

11. The polymer of claim 1 having a ratio of NTA/PEI between 0.6 and 1.2.

12. The polymer of claim 1 in the form of granules in a size range such as to pass through a 10 mesh screen and be retained by an 80 mesh screen of the U.S. Sieve Series.

13. The polymer of claim 1 having the propensity to hold at saturation with said heavy metals, an amount of said metals between 5% and 30% based upon the dry weight of the polymer.

14. A sulfur-containing water insoluble hydrogel polymer having the ability to selectively absorb dissolved trace heavy metal species, said polymer having been produced by the steps of:

a) forming a prepolymer solution by dissolving NTA and PEI in water, b) heating said prepolymer solution to drive off the water of solution, and continuing said heating to cause a cross-linking reaction to occur between the NTA and PEI to produce a solid water-insoluble polyamide first reaction product, c) contacting said first reaction product with water to produce a water-swollen first reaction product, and d) contacting said water-swollen first reaction product with carbon disulfide under conditions that permit said carbon disulfide to vaporize and interact with said water-swollen first reaction product.

15. The polymer of claim 14 wherein said cross-linking reaction is effected at a temperature between 140° C. and 160° C.

16. The polymer of claim 14 wherein the water that contacts said first reaction product contains dissolved therein a strong base, thereby producing a base-neutralized first reaction product.

17. The polymer of claim 14 wherein the conditions under which said carbon disulfide reacts with said water-swollen first reaction product involve temperatures in the range of 4° C. to 33° C.

18. The polymer of claim 17 wherein the conditions under which said carbon disulfide reacts with said water-swollen first reaction product are such as to require a reaction time between 12 and 35 hours.

19. The polymer of claim 1 capable of removing dissolved heavy metals in the presence of EDTA.

* * * * *